United States Patent [19]
Green

[11] 4,034,605
[45] July 12, 1977

[54] MANEUVER MARGIN PRESENTING

[75] Inventor: David Lee Green, Potomac, Md.

[73] Assignee: Pacer Systems Inc., Burlington, Mass.

[21] Appl. No.: 617,000

[22] Filed: Sept. 26, 1975

[51] Int. Cl.² .................................... G01C 21/00
[52] U.S. Cl. ...................... 73/178 H; 116/DIG. 43
[58] Field of Search ............ 73/178 H, 182, 178 R, 73/178 T, 117.3; 235/89 R, 61 A, 61 B; 116/DIG. 43

[56] References Cited
U.S. PATENT DOCUMENTS

| 3,608,368 | 9/1971 | Cuff | 73/117.3 |
| 3,616,691 | 11/1971 | Brandan | 73/178 H |

Primary Examiner—Donald O. Woodiel
Attorney, Agent, or Firm—James C. Wray

[57] ABSTRACT

Power required curves for ratios of helicopter weight to air density ratio form a background over which move perpendicular bars representing air speed and engine torque. The intersection of the relatively movable bars indicates which power required curve the helicopter is operating on. An area to the right and above that curve represents power margin available for maneuvering. A knob positions a mask over a portion of the background to indicate the actual maximum power limitation of the helicopter. A maximum power setting is varied according to ambient pressure and temperature. A minimum speed warning is produced by comparing air speed and engine torque. A rapid descent automatically raises the minimum speed warning.

35 Claims, 11 Drawing Figures

MANEUVER MARGIN PRESENTING

BACKGROUND OF THE INVENTION

It is well known that the level flight power required for helicopters to hover decreases as air speed is increased above 0 knots. In the absence of some relative wind, hovering requires more power than slow speed forward flight. Most helicopters experience a large change in power required for level flight in the speed range of from 10 to 40 knots. As the air speed increases to 40 knots and somewhat beyond, the power required for level flight is reduced.

To reduce speeds of a helicopter from speeds above 40 knots to relative air speeds of about 10 knots, a great increase in power is required. A further increase in power required, although usually not so much, is necessary for hovering when the air speed is reduced from 10 knots to 0 knots.

As speeds increase from about 60 knots upward, the power required for level flight increases, but usually at a lower rate than the rate of power increase required to slow from about 40 knots to 10 knots.

The power required for level flight is a function of air speed and a ratio of gross weight of the heilcopter to density ratio of the air compared with the density at sea level. For relatively large gross weights steep power increases are required. For smaller gross weights increases of power to slow the helicopter and to hover are less steep.

Each helicopter model is usually accompanied by graphs which compare pressure altitudes or density altitudes with gross weights and head winds and which plot several different curves for different ambient temperatures. Determining expected operational parameters of ambient temperatures and pressure altitudes, pilots use the charts to determine the gross weight which they will be able to carry. When continous winds are expected, the pilot can reference the charts to determine the additional weight which can be carried during takeoff or landing.

The charts are cumbersome and are difficult and time consuming to use. The determinations of estimated pressure, altitude and ambient temperature, necessary to enter on the charts, are difficult to make accurately. The gross weight of a craft is difficult to ascertain and to limit accurately. For various reasons such as operational hours, maintenance conditions, fuel variations and ambient conditions, power output capabilities of a craft may not be known.

All these factors lead to the making of conservative estimations on charts. Pilots, recognizing the conservative data, may be prone to exceed the charged limitations.

Present day helicopters are equipped with power measuring and displaying apparatus and particularly apparatus to measure reaction torque between an engine and a main transmission. The reaction is presented in the cockpit in terms of normal rated power or take-off power. In some cases, torque is presented in terms of pressure, for example, from 0 to 60 pounds per square inch. Engine torque display is used by pilots to set and adjust power demand.

Pilot flight manuals provide information showing how power changes with increasing wind and how maximum take-off gross weight changes with wind. The intent of the information is the same in both cases. In both cases a density altitude at operating conditions is selected. The pilot next determines the power or weight trade-off with changing air speed.

Prudent helicopter pilots prefer to operate with a known or high maneuver margin capability to provide available reaction power for unforeseen circumstances. However, because of the steep increase of power requirement, particularly for helicopters with high gross weights, the actual maneuver margin capability of a helicopter is hard to estimate as the aircraft slows to a hover.

Complex apparatus and systems have been devised with the object of determining helicopter lift margins. Heretofore, no system has been provided to present in a simple manner maneuver margins for helicopters.

PRIOR ART

Helicopter and aircraft measurement and control systems are found in the official classifications of the United States Patent and Trademark Office in Class 73, subclass 178H, which deals with helicopter measurement systems, and in Class 235, subclasses 150.2, .21 and .22 which include vehicle and aircraft indicator systems and indicator and control systems.

Examples of pertinent patents are:
U.S. Pat. Nos. 3,697,731; 3,590,636; 3,754,440; 3,537,323; 3,616,691; 3,048,836; 2,845,623.

U.S. Pat. No. 3,754,440 describes a complex system for determining helicopter lift margin in terms of hundreds of pounds of gross weight. The system described in that patent uses several different inputs and complex electronic circuitry to produce readings of gross weights. These is no direct presenting of whether a helicopter will be able to hover under existing conditions, and there is no display of available power margin.

U.S. Pat. No. 3,537,323 describes a hover-altitude performance indicator for a helicopter which uses a plurality of pressure transducers associated with landing gear struts of a helicopter to sense the gross weight of the helicopter and to display the gross weight indication against a portion of a manually selected chart from a long tape.

The complex computer for use in a helicopter prior to take-off to determine whether the engine has sufficient capability to complete a mission is described in U.S. Pat. No. 3,616,691.

A density altitude indicating signal which uses several computers to determine aircraft lift capability is described in U.S. Pat. No. 3,590,636.

The other patents above-cited are of general interest. Included in the patents selected are descriptions of apparatus which is well-known for measuring operational characteristics such as engine torque and for converting measured signals to movements of indicators such as bars transversely across a face of an indicator.

SUMMARY OF THE INVENTION

Most helicopters experience a large change in power required for level flight in the speed range 10–40 knots: gradient or shape of the curve changes for a given gross weight/density ratio of air.

Pilot flight manuals provide information showing how power changes with increasing wind, and/or how maximum take-off weight changes with wind. The intent of the information is the same in both cases. In both cases a density altitude is selected for operating conditions. The pilot can next determine the power trade-off or weight trade-off with changing air speed or relative wind.

Commercially available air speed systems provide wind information which is available to pilots of helicopters. Reaction torque is measured between an engine and transmission and is presented in the cockpit in terms of percent of normal rated power or take-off power.

Hover performance charts are provided in helicopter flight manuals for pilot reference. The impact of wind is depicted on these charts as causing a reduction in power required. As the mangitude of the wind increases above zero knots, the power required to hover deceases. The applicant has determined that these wind-power characteristics can be cross-plotted onto the face of an $x$—$y$ type display. When air speed and engine torque signals are used to drive the $x$—$y$ base, the product is an inexpensive maneuver margin display.

A generated air speed signal drives a vertical bar and engine torque drives a horizontal bar. When slowing down through about 45 knots, the vertical bar comes off of the limit stops on the right side of the display. The position of the horizontal bar corresponds to the power being demanded by the pilot, regardless of the aircraft's flight condition. When the aircraft is stabilized in level flight at, for example, forty knots air speed, the bars intersect over one of the reference curves or just above or just below a reference curve. If the aircraft is slowed by an increment of ten knots to thirty knots air speed, the bars relocate to thirty knots and a higher power setting. When level flight is established at thirty knots the bar intersection will be over the same reference curve that was observed in the forty knot case. The reference curve represents the power required curve for the original set of operating conditions, i.e., gross weight, density altitude, rotor rotations per minute, sideslip and rate of climb or descent.

Once the correct reference curve is identified, one can predict the power required for level flight as the aircraft decelerates to a slower speed.

A full-power check establishes the power available. The full power check causes the horizontal bar to move upscale to a point corresponding to the maximum engine power available. The pilot takes note of the relationship between the bar location at full power and the reference curve identified earlier as corresponding to the current flight conditions.

If the full power location of the horizontal bar crosses the reference curve, the crossing point identifies the air speed corresponding to the minimum air speed for level flight. If a hover were attempted at a lower air speed, the result would be settling with inadequate power or "power settling". Approaching a high altitude hover site or while maneuvering at slow speeds, the pilot knows he must not decelerate below his minimum safe air speed when in close proximity to trees or rough terrain.

Under certain conditions there is a need to maintain a certain minimum reserve power available for quick height control maneuvers. In some cases it may be possible to hover at zero air speed but the reserve power is very small, corresponding to a 200 feet per minute rate of climb. The flight profile may require a vertical maneuver margin which is adequate to generate a 500 feet per minute rate of climb. There is some minimum air speed above which this climb performance will be available. The minimum air speed for the desired performance is established just as it was for the level flight air speed check.

Once a minimum air speed is determined it may be useful to set this speed into a visual or aural warning system. For example, a three light system presents a "fast" cue, and "on speed cue" and a "slow" cue. Flashing the lights or having them come on in overlapping combinations serves to expand the gradations of warning provided. Such a light bar is advantageously provided on both sides of the instrument panel, above the sun shield.

In an example of operation, shortly after take-off, the pilot conducts a full power check to determine what percentage of rated power is available. The pilot adjusts a power-available mask using a knob provided on the display, rolling the mask down to match up with the power available as indicated by the position of the horizontal bar.

When the pilot establishes constant speed and constant altitude flight, he notes which reference curve falls under the bar intersection.

The area above the reference curve and below the power available mask represents excess power available for maneuvering at any given air speed.

One object of the invention is the provision of maneuvering margin presenting apparatus having means for presenting air speed, means for presenting engine power, and means for presenting a comparison of the engine power and air speed.

Another object of the invention is the provision of maneuver margin presenting apparatus having a power curve plate positioned adjacent power indicating means and the air speed indicating means, and wherein the plate has a power curve for comparing with the air speed and the engine power.

The invention has as another object the provision of maneuver margin presenting apparatus wherein engine power and air speed indicators comprise separate moving bars mounted for movement across power curves.

The invention has as another object the provision of maneuver margin presenting apparatus with a mask means connected to comparator means and movable across a power curve plate in a direction of movement of an engine power moving bar.

Another object of the invention is the provision of maneuver margin presenting apparatus with a mask mounted adjacent a comparator for selectively masking part of the comparator.

A further object of the invention is the provision of maneuver margin display apparatus comprising a comparator having a power curve carrier having plural power curves indicated thereon, an air speed indicator comprising a movable bar mounted on the comparator for movement in a first direction across the comparator, and an engine torque indicating bar mounted on the comparator means for movement across the power curve plate perpendicular to the air speed indicating bar, whereby an intersection of the bars presents a position on a particular power curve, whereby power margin for maneuvering is readily ascertainable as an area on one side of the curve.

The invention has as another object the provision of maneuver margin presenting apparatus with comparator means comprising an instrument with performance curves for a particular helicopter on the instrument.

Another object of the invention is the provision of maneuver margin presenting apparatus wherein a comparator means comprises an indicator plate with plural power-required curves for ratios of helicopter gross weights to air density ratios.

Another object of the invention is the provision of a maneuver margin presenting method comprising present air speed and engine power indications, comparing air speed and engine power and presenting a comparison of engine power and air speed.

This invention has as another object the provision of a maneuver margin presenting method comprising presenting a power curve adjacent power and air speed indications, and comparing the air speed and power indications with the power curve.

Another object of the invention is the provision of a maneuver margin presenting method comprising separately moving air speed and power indicator bars across power curves.

A further object of the invention is the provision of a maneuver margin presenting method further comprising masking a part of a comparing means by moving a mask across a power curve in a direction of movement of an engine power indicator bar.

Another object of the invention is the provision of a maneuver margin display method including presenting a power curve plate having plural power curves indicated on the plate, moving an air speed indicating bar in a first direction across the power curve plate, and moving an engine torque indicating bar across the power curve plate perpendicular to the air speed indicating bar, whereby an intersection of the bars presents a position on a particular power curve, whereby power margin for maneuvering is readily ascertainable as an area above the curve.

One object of the invention is the provision of maneuver margin presenting method and apparatus for presenting available power, and adjusting presentation of available power according to changes in ambient conditions.

Another object of the invention is the provision of maneuver margin presenting methods and apparatus for adjusting indicated power-available by measuring ambient pressure and ambient temperature and correcting indicated power-available according to changes in ambient pressure and temperature.

This invention has as a further object maneuver margin presenting methods and apparatus for presenting a warning of minimum speed in reponse to comparing air speed and engine power.

Another object of the invention is the provision of maneuver margin presenting methods and apparatus for measuring available engine power, measuring actual engine power, comparing the actual engine with the available power and indicating a minimum speed warning according to a comparison of actual engine power and available power. A further object of the invention is the provision of maneuver margin presenting methods and apparatus for measuring air speed and comparing air speed with actual engine power before indicating a minimum speed warning.

This invention has as another object the provision of maneuver margin presenting methods and apparatus for measuring ambient pressure and correcting an available power measurement according to the measurement of ambient pressure.

Another object of the invention is the provision of maneuver margin presenting methods and apparatus for measuring rate of change of altitude and correcting and indicating of minimum speed according to the rate of change of altitude.

These and further objects and features of the invention are apparent in the disclosure which includes the above and ongoing specification with the claims and the drawings.

DETAILED DESCRIPTION OF THE DRAWINGS

Figure 1:
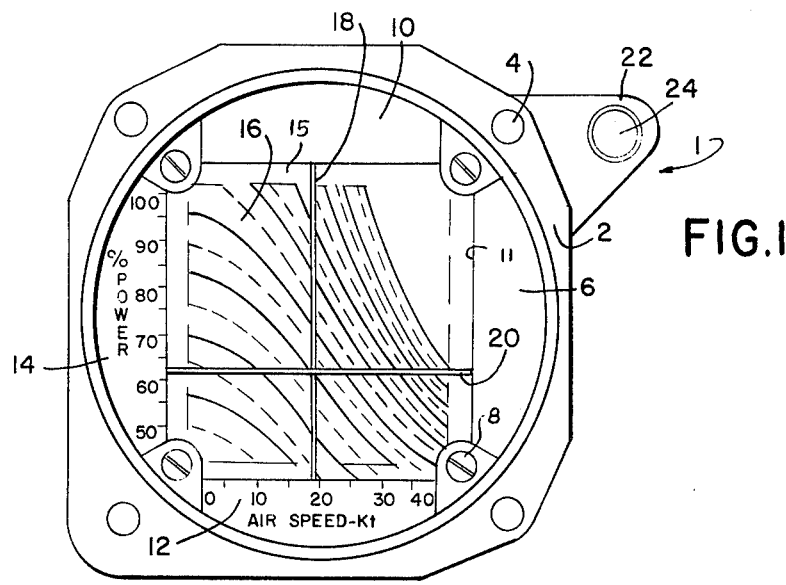
FIG. 1 is a front view of a maneuver margin display.

Referring to FIG. 1, a maneuver margin display apparatus is generally indicated by the numeral 1. The display apparatus comprises a conventional aircraft instrument casing having a frame 2 with fasteners 4 for mounting the frame on a wall of a cockpit, preferably directly in front of a pilot. The frame 2 supports a glass cover 6. Within the glass boundaries fasteners 8 on lugs hold a fairing plate 10 over movable elements. The fairing plate 10 has a rectangular, preferably square, opening 11. Air speed increments 12 in knots are machined along one edge of the opening. Torque indicated as percent of engine power is shown in markings 14 along an edge of opening 11 which is perpendicular to the edge along which air speed indications are presented. A plate 15 spaced rearward from fairing 10 has plural power required curves 16, which are developed for the particular helicopter on which the instrument is mounted. To aid in perception, the curves are alternately drawn with solid and dash lines, and alternating areas between curves are variedly shaded, stippled, or colored so that individual curves are readily recognized. Vertical bar 18 moves in a horizontal direction to indicate air speed, which may be read on scale 12. Horizontal bar 20 moves vertially to indicate torque or percent power.

The bars 18 and 20 are moved by well known air craft measurement, telemetering and indicating apparatus, which is not part of the present invention.

When the helicopter is sustaining level flight, air speed bar 18 intersects with torque indicating bar 20 over a particular curve. Due to the characteristics of the helicopter and the construction of the curves, when level flight is attained at some other speed, the bars intersect over the same curve. Thus, by glancing at the instrument, and following the curve under the intersection of the bars, the pilot easily assesses the power requirement for hovering or flying at reduced speeds. The pilot readily ascertains the maneuver margin available by observing the remaining area above the curve at the desired speed. For example, if the pilot is flying level at 20 knots, as indicated in the display in FIG. 1, he readily ascertains that it will take about 83% power to hover, leaving a margin of 17% power for maneuvering, provided full power is available. Using the same system, and proceeding along the curve the pilot realizes that he has about a 35% margin at 20 knots and that he would have about 25% margin if he slowed to 10 knots.

Figure 2:
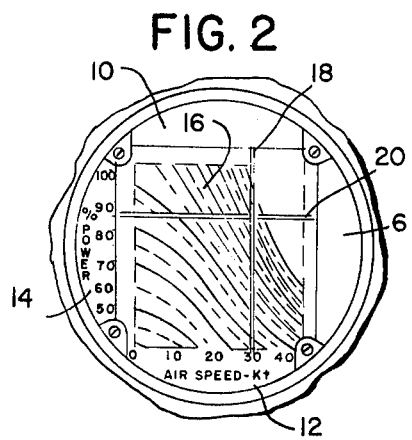
FIG. 2 is a front view of the maneuver margin display during a full power check.
Figure 3:
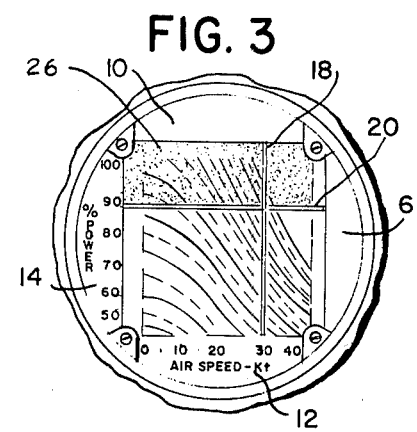
FIG. 3 is a front view of the maneuver margin display with a mask turned down to mask out unavailable power.
Figure 4:
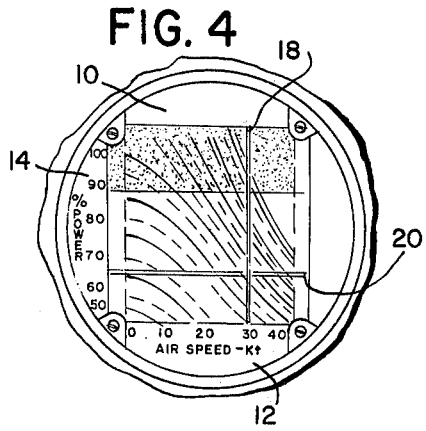
FIG. 4 is a front view of a maneuver margin display showing the air speed bars and power bars intersecting over a power curve during level flight.
Figure 5:
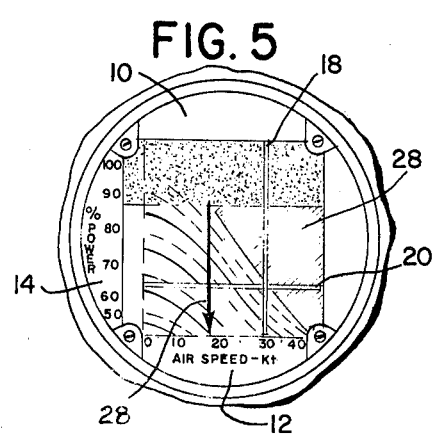
FIG. 5 is a front view of a maneuver margin display showing minimum speed for level flight and maneuver margin power available.

Shortly after take-off, the pilot conducts a full power check by opening the throttle. The horizontal bar 20 moves upward to a maximum upward position as shown in FIG. 2. That is the total power that is available under the ambient conditions and helicopter conditions. The power indicated above horizontal bar 20 in FIG. 2 is not available to the pilot. To record the inavailability of that power on the instrument, the maneuver margin display is equipped with a masking device as shown in FIGS. 1 and 3. The frame 2 has an extension 22 and a knob 24 which is turned to the left to lower a mask 26 over the upper portion of the power plate 15 to indicate that that power is not available. Mask 26 remains in place during operation of the helicopter. The mask 26 is a flexible, opaque shade which moves along tracks on plate 15 beneath fairing 10. The mask 26 is stored on a horizontal roller and is moved downward by continuous cords in a well-known manner, such as by conventional gears, shafts, pulleys and rollers, When the pilot establishes constant speed and constant altitude flight, the cross bars assume a position such as shown in FIG. 4. The pilot notes which curve the intersection of the cross bars overlies. In the case of FIG. 4, the cross bars overlie the dashed curve in the central shaded area. The pilot will observe that flying at thirty knots he has a power margin of about 25% for maneuvering, and that if he slows to 20 knots he will have very little maneuver margin. He will see that he cannot fly at speeds less than 15 to 20 knots at a level altitude. As previously described, the pilot easily recognizes on which power curve his helicopter is operating. As shown in FIG. 5, a movable pointer is provided so that the pilot may position the pointer at the intersection of the particular power requirement curve and the mask which indicates maximum power. The adjustable pointer 28 then indicates the precise minimum air speed at which level flight can be obtained.

The shaded area above the power requirement curve on which the helicopter is operating is the margin of power available for maneuvering at the varied speeds.

Figure 6:
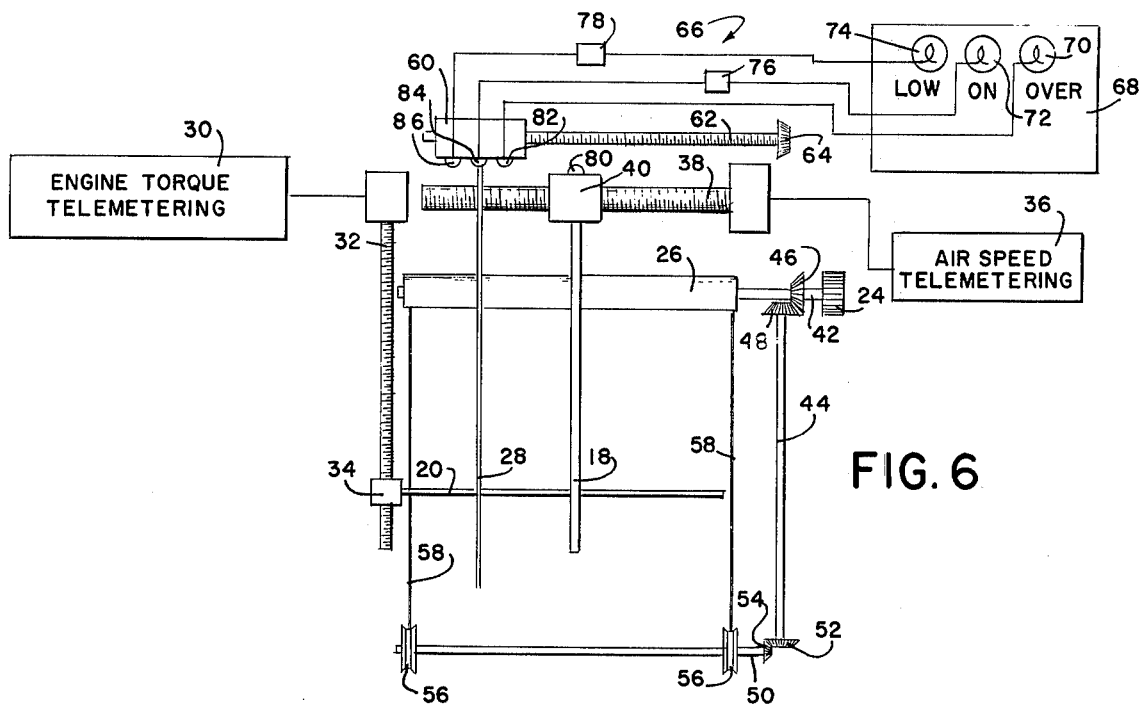
FIG. 6 is a schematic detail of the drive means for the maneuver margin display cross bars with a minimum speed warning system.

The operation of the system is shown schematically in FIG. 6. Conventional engine torque telemetering apparatus 30 drives a screw 32. Power indicating bar 20 is mounted on a nut 34 which reciprocates along 32 as the telemetering apparatus 30 turns the screw. Known air speed telemetering apparatus 36 drives a screw 38. Air speed indicating bar 18 is mounted on a nut 40 which moves along the screw 38 as it turns. The intersection of bars 18 and 20 indicates the required power curve on which the helicopter is operating.

To mask the upper portion of the power curve plate, a pilot turns knob 24 which turns a shaft 42 which is connected to a mask storing roller. Shaft 42 drives shaft 44 through meshing gears 46 and 48. Shaft 44 drives shaft 50 through gears 52 and 54. Pulleys 56 on shaft 50 draw cords 58 downward, and haul mask 26 downward. Cables 58 are connected to pulleys 56, and pulleys 56 are substantially the same size as the mask roller, so that there is a positive drive in either direction upon turning knob 24.

As described with reference to FIG. 5, the minimum speed pointer is adjusted at the intersection of the mask 26 and the required power curve which extends upward from the intersection of bars 18 and 20. Pointer 28 is connected to a nut 60 which is turned by screw 62 and knob 64.

A minimum speed warning system generally indicated by the numeral 66 is provided. Over the sunshield in a peripheral area of the pilot's vision, a minimum speed indicator plate 68 is provided. A green lamp 70 on the plate indicates that a safe overspeed condition exists. A yellow lamp 72 indicates that the helicopter is at or near minimum speed. Red lamp 74 indicates that the helicopter is below minimum speed.

The yellow and red lamps 72 and 74 are provided with flashers 76 and 78 respectively.

Nut 40 on which speed indicating bar 18 is mounted carries a contact 80 which contacts one or two of the three contacts 82, 84 and 86 on nut 60. When contact 82 is touched by contact 80, the green lamp 70 is lighted indicating that the helicopter is flying at slightly above the speed necessary to maintain level flight. When the contact 80 touches contact 84, the yellow lamp 72 is lighted to indicate that the helicopter is flying at the minimum speed necessary to maintain level flight. When contact 80 touches contact 86, red lamp 74 is lighted to indicate that the helicopter is flying at a speed less than required.

When moving relative to the other contacts, contact 80 may touch two contacts. The lighting of a green and yellow light indicate that the helicopter is slightly over the minimum speed required to maintain level flight. When contacts 84 and 86 are touched by contact 80 yellow and red lamps 72 and 74 flash to indicate the slight underspeed condition.

Well-known electrical circuits may be provided so that green light 70 remains on until contact 82 is touched by contact 80, whereupon the yellow and green lamps are lighted. In that embodiment as the contact 80 leaves the contact 82, the green lamp is extinguished. As contact 80 touches contact 86, the red lamp is lighted, and it remains lighted until contact 80 again touches contact 84.

Figure 7:
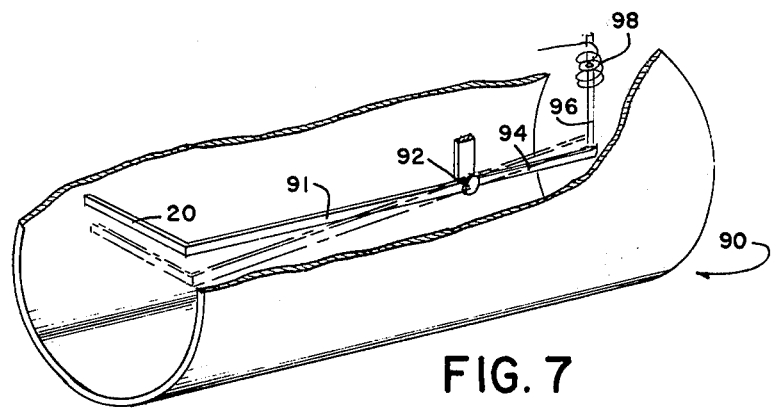
FIG. 7 shows a preferred instrument bar drive.

As shown in FIG. 7, known instruments 90 which move bars in traverse across an instrument face employ long pivoted arms driven by volt meter-type coils. In an embodiment 90 for driving horizontal power-indicating bar 20 the bar 20 is rigidly connected to an end of arm 91 at right angles. The arm 91 is pivoted at 92. The short part of the arm 94 has an extension 96 which is moved by coil 98 according to the voltage supply to the coil. As voltage from the telemetering system varies, indicating changes in torque, element 96 is moved, moving bar 20.

The present system presents true air speed from the air speed presenting apparatus. However, indicated air speed may be employed. The system may use indicated torque. In a preferred embodiment the system uses referenced torque as an input.

Figure 8:
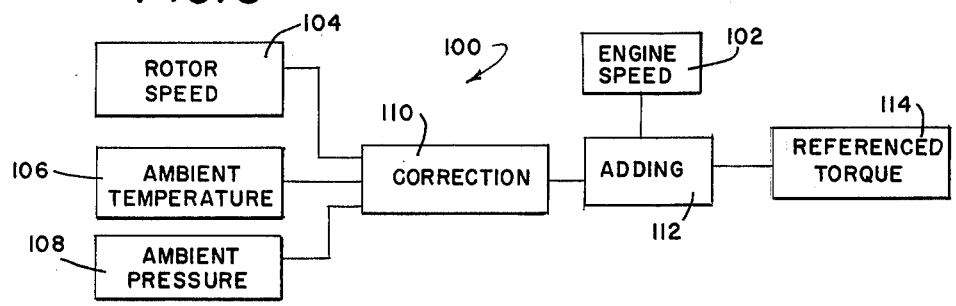
FIG. 8 is a schematic drawing showing production of referred torque.

The referenced torque is created in a system 100 using standard available commercial devices and circuitries, as shown in FIG. 8. Engine torque is measured with conventional apparatus 102, and rotor speed is measured with conventional apparatus 104. Ambient temperature and pressure are measured with devices 106 and 108. The rotor speed and ambient temperature and pressure are inputs to a correction circuitry 110 and to an adder 112 which correct the engine torque to a referenced torque 114 which is input to the engine torque telemetering circuit 30 shown in FIG. 6.

Figure 9:
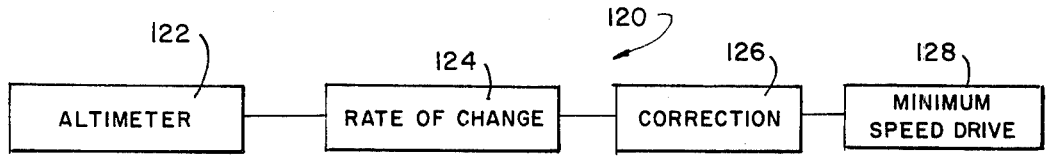
FIG. 9 is a schematic illustration of a system for changing indications of minimum speed required for level flight in response to vertical movements of a helicopter.

The maneuver margin, especially the ability to stop a descent, requires greater power as the rate of descent increases. The present invention provides an indication of that changing requirement by correcting the minimum speed indicator drive according to rate of change of pressure or rate of change of altitude. In FIG. 9, a minimum speed indicator changing system 120 is shown. Altimeter 122 is connected to a conventional rate of change circuit 24, and a correction circuit 126 is connected to the rate of change circuit. The correction circuit 126 provides signals to the minimum speed drive 128 for adjusting position of the minimum speed indicator to raise the minimum speed indication as the rate of descent increases.

Figure 10:
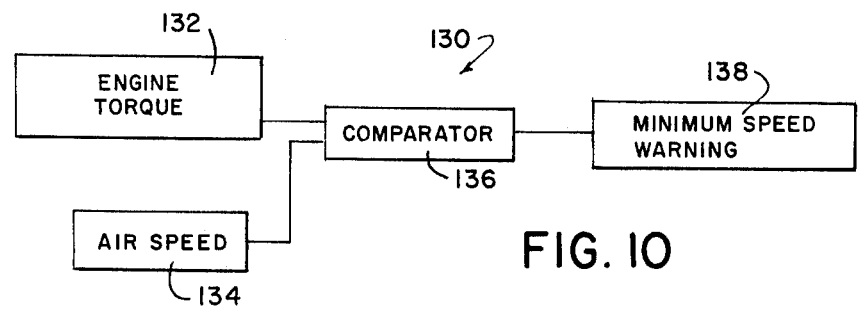
FIG. 10 is a schematic drawing of a minimum speed warning system of the invention.

FIG. 10 is a schematic representation of a maneuver margin presenting system 130 for presenting a minimum speed warning. Engine torque 132 is measured in a conventional manner. Available power is measured by running a full power check, and the value of the measured full power is maintained in comparator 136. Comparator 136 produces an output when the acutal power approaches the available power and creates a minimum speed warning 138. The warning may be in the form of lamps. For example, a green lamp within a peripheral vision area may be lighted while the engine torque is far from the available power. As engine torque approaches available power, a yellow lamp and then a red lamp replace the green lamp.

Alternatively, warning sounds may be employed. For example, a steady tone may indicate an approach to available power, a warbling sound may indicate a close approach, and an obnoxious noise may indicate the employed power has reached the power at higher rates with lower air speeds. An air speed input 134 to the comparator causes the minimum speed warning 138 to begin at a larger differential between the engine torque 132 and the available power at lower air speeds.

Figure 11:
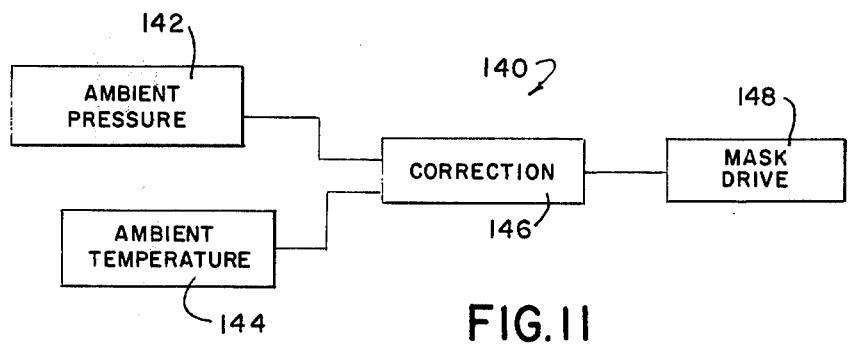
FIG. 11 is a schematic showing of an available power indication adjusting system of the present invention.

Because available power decreases with changes in ambient conditions, a correction means is provided to change the indicated available power. The available power due to helicopter conditions is measured periodically, for example, weekly by full power checks, whereupon an indication of available power is maintained in device 136. Changes to the available power by ambient conditions are made by a device such as generally indicated by the numeral 140 in FIG. 11. Ambient pressure 142 and ambient temperature 144 are sensed and are provided to a correction means 146 which automatically operates the mask drive 148 to lower the mask 26 shown in FIG. 1, indicating reduced available power upon changes in ambient conditions such as a reduction in pressure.

The required power curves on the indicator are curves which are developed for the most adverse atmospheric conditions.

While the invention has been described with reference to specific embodiments, it will be obvious to those skilled in the art that modifications and variations of the invention may be constructed without departing from the scope of the invention. The scope of the invention is defined in the following claims.

I claim:

1. Maneuver margin presenting apparatus comprising moveable air speed input indicator means for presenting air speed, moveable engine power input indicator means for presenting engine power cooperating with the air speed input indicator means, and a comparator means positioned adjacent to the air speed input indicator means and the engine power input indicator means for presenting the engine power with respect to the air speed indicative of maneuver margin.

2. The maneuver margin presenting apparatus of claim 1 wherein the comparator means further comprises a power curve plate positioned adjacent the power input means and the air speed input means, and wherein the plate has a power curve for comparing with the air speed input means and the engine power input means.

3. The maneuver margin presenting apparatus of claim 2 wherein the power curve plate has plural power curves.

4. The maneuver margin presenting apparatus of claim 3 wherein the engine power input means and the air speed input means comprise separate moving bars mounted for movement across the power curves on the plate.

5. The maneuver margin presenting apparatus of claim 4 further comprising mask means connected to the comparator means and movable across the power curve plate in a direction of movement of the engine power indicator bar.

6. The maneuver margin presenting apparatus of claim 1 wherein the air speed input means and the engine power torque means comprise separate moving bars mounted adjacent the comparator means.

7. The maneuver margin presenting apparatus of claim 1 further comprising mask means mounted adjacent the comparator means for selectively masking part of the comparator means.

8. The maneuver margin presenting apparatus of claim 1 wherein the engine power input means is an engine torque indicating means.

9. The maneuver margin display apparatus of claim 1 wherein the comparator means comprises a power curve plate having plural power curves indicated on the plate, wherein the air speed indicator comprises a movable bar mounted on the comparator means for movement in a first direction across the comparator means, and wherein the engine power input means comprises an engine torque indicating bar mounted on the comparator means for movement across the power curve plate perpendicular to the air speed indicating bar, whereby an intersection of the bars presents a position on a particular power curve, whereby power margin for maneuvering is readily ascertainable as an area on one side of the curve.

10. The maneuver margin presenting apparatus of claim 1 wherein the comparator means comprises a plate with performance curves for a particular helicopter on the plate.

11. The maneuver margin presenting apparatus of claim 1 wherein the comparator means comprises a plate with plural power required curves of ratios of helicopters weights to air density ratios.

12. The maneuver margin presenting apparatus of claim 1 further comprising means for presenting available power, and means for adjusting presentation of available power according to changes in ambient conditions.

13. The maneuver margin presenting apparatus of claim 12 wherein the adjusting means comprises means for measuring ambient pressure and ambient temperature and means for correcting indicated power available according to changes in ambient pressure and temperature.

14. The maneuver margin presenting apparatus of claim 1 further comprising means for presenting a warning of minimum speed in response to comparing the air speed and the engine power.

15. The maneuver margin presenting apparatus of claim 1 further comprising means for measuring available engine power, means for measuring actual engine power, means for comparing the actual engine power with the available power, and means for indicating a minimum speed warning according to a comparison of actual engine power and available power.

16. The maneuver margin presenting apparatus of claim 15 further comprising means for measuring air speed, and means connected to the air speed measuring means, to the actual engine power measuring means and to the indicating means for comparing air speed with acutal engine power before indicating the minimum speed warning.

17. The maneuver margin presenting apparatus of claim 16 further comprising means for measuring ambient pressure and means connected to the pressure measuring means and to the available power measuring means for correcting the available power measurement according to the measurement of ambient pressure.

18. The maneuver margin presenting method of claim 15 further comprising means for measuring rate of change of altitude and means connected to the rate of change measuring means and to the minimum speed indicating means for correcting the indicating of minimum speed according to the rate of change of altitude.

19. The maneuver margin presenting method comprising presenting an air speed indication on a display and presenting engine power indication on the display with relatively moveable cooperative indicators and comparing the air speed and the engine power and presenting a comparison of the engine power and air speed indications on the display to indicate maneuver margin.

20. The maneuver margin presenting method of claim 19, wherein the comparing step further comprises presenting a power curve adjacent the power indication and the air speed indication means, and wherein the comparing comprises comparing the air speed indication and engine power indications with the power curve.

21. The maneuver margin presenting method of claim 20 wherein the presenting a power curve step comprises presenting plural power curves.

22. The maneuver margin presenting method of claim 21 wherein the presenting engine power indication and the presenting air speed indication comprise separate moving bars across the power curves.

23. The maneuver margin presenting method of claim 22 further comprising masking a part of a comparing means by moving a mask across a power curve in a direction of movement of an engine power indicator bar.

24. The maneuver margin presenting method of claim 23 wherein the presenting air speed engine power comprises separately moving indicator bars adjacent a comparing means.

25. The maneuver margin presenting method of claim 19 further comprising masking part of a comparing means.

26. The maneuver margin presenting method of claim 19 wherein the presenting engine power comprises presenting engine torque.

27. The maneuver margin display method of claim 19 wherein the comparing comprises presenting a power curve plate having plural power curves indicated on the plate, wherein the presenting air speed indication comprises moving an air speed indicating bar in a first direction across the power curve plate, and wherein the presenting engine power indication comprises moving an engine torque indicating bar across the power curve plate perpendicular to the air speed indicating bar, whereby an intersection of the bars presents a position on a particular curve, whereby power margin for maneuvering is readily ascertainable as an area on one side of the curve.

28. The maneuver margin presenting method of claim 19 wherein the comparing step comprises a presenting plate with performance curves for a particular helicopter on the plate.

29. The maneuver margin presenting method of claim 19 wherein the comparing step comprises presenting a plate with plural power required curves of ratios of helicopter weights to air density ratios.

30. The maneuver margin presenting method of claim 19 further comprising the steps of presenting available power, and adjusting presentation of available power according to changes in ambient conditions.

31. The maneuver margin presenting method of claim 30 wherein the adjusting step comprises measuring ambient pressure and ambient temperature and correcting indicated power available according to changes in ambient pressure and temperature.

32. The maneuver margin presenting method of claim 19 further comprising presenting a warning of minimum speed in response to comparing the air speed and the engine power.

33. The maneuver margin presenting method comprising measuring available engine power, measuring actual engine power, measuring actual air speed, comparing actual air speed with actual engine power, indicating a minimum speed warning according to a comparison of the actual air speed, the actual engine power and the available power.

34. The maneuver margin presenting method of claim 33 further comprising measuring ambient pressure and correcting the available power measurement according to the measurement of ambient pressure.

35. The maneuver margin presenting method of claim 33 further comprising measuring rate of change of altitude and correcting the indicating of minimum speed according to the rate of change of altitude.

* * * * *